United States Patent [19]

Emmerich et al.

[11] 4,299,510
[45] Nov. 10, 1981

[54] DRILL STEEL AND METHOD OF FABRICATION

[75] Inventors: Kenneth C. Emmerich; Donald K. Chrise, both of Lexington, Ky.

[73] Assignee: Fansteel Inc., North Chicago, Ill.

[21] Appl. No.: 967,274

[22] Filed: Dec. 7, 1978

[51] Int. Cl.³ .............................................. F16B 11/00
[52] U.S. Cl. .................................... 403/282; 285/382
[58] Field of Search .............. 403/274, 279, 282, 285, 403/292; 29/520; 285/382, 382.2

[56] References Cited

U.S. PATENT DOCUMENTS

| | | | |
|---|---|---|---|
| 1,169,642 | 1/1916 | Heeter | 403/274 |
| 1,348,967 | 8/1920 | Somers | 29/520 UX |
| 1,547,125 | 7/1925 | Keller | 29/520 UX |
| 1,670,532 | 5/1928 | Crawford | 29/520 |
| 1,832,954 | 11/1931 | Weatherhead, Jr. | 29/520 UX |
| 2,795,039 | 6/1957 | Hutchins | 285/382.2 X |
| 2,852,843 | 9/1958 | Banta et al. | 29/520 UX |

FOREIGN PATENT DOCUMENTS

| | | | |
|---|---|---|---|
| 581182 | 10/1946 | United Kingdom | 403/292 |
| 733078 | 7/1955 | United Kingdom | 403/292 |

*Primary Examiner*—Andrew V. Kundrat
*Attorney, Agent, or Firm*—Barnes, Kisselle, Raisch & Choate

[57] ABSTRACT

A drill steel and method of making the drill steel which includes a tube which is opened up at one end by a first punch strike after which a male insertion element with external indentations is mounted on a second punch and driven partially into the opened end of the drill steel while simultaneously striking the drill steel at the end to collapse the walls of the tube around the element and into the indentations to lock the element in the tube. The finished drill steel thus has a male end to insert telescopically into the end of a similar steel to provide necessary extension devices.

5 Claims, 12 Drawing Figures

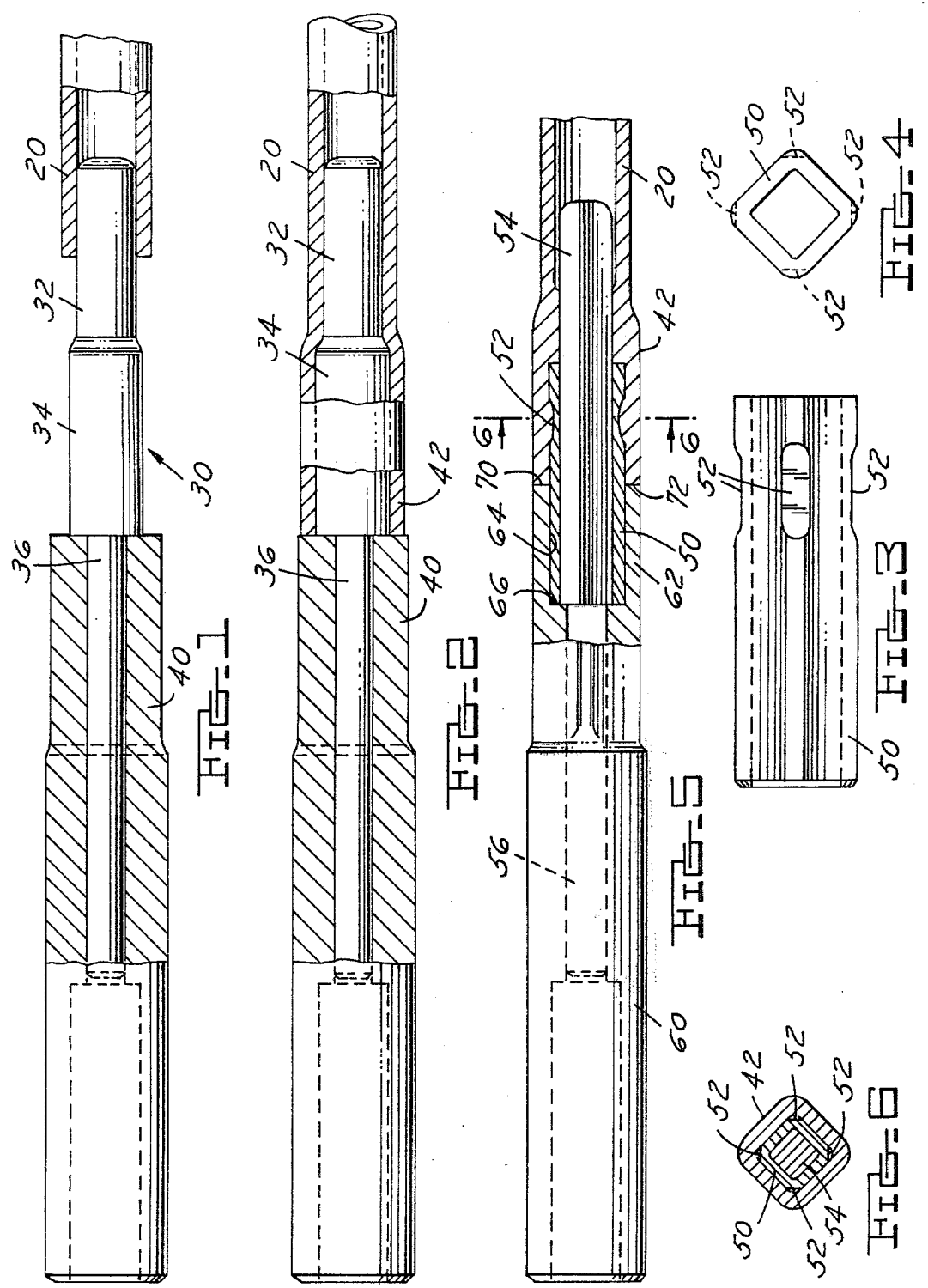

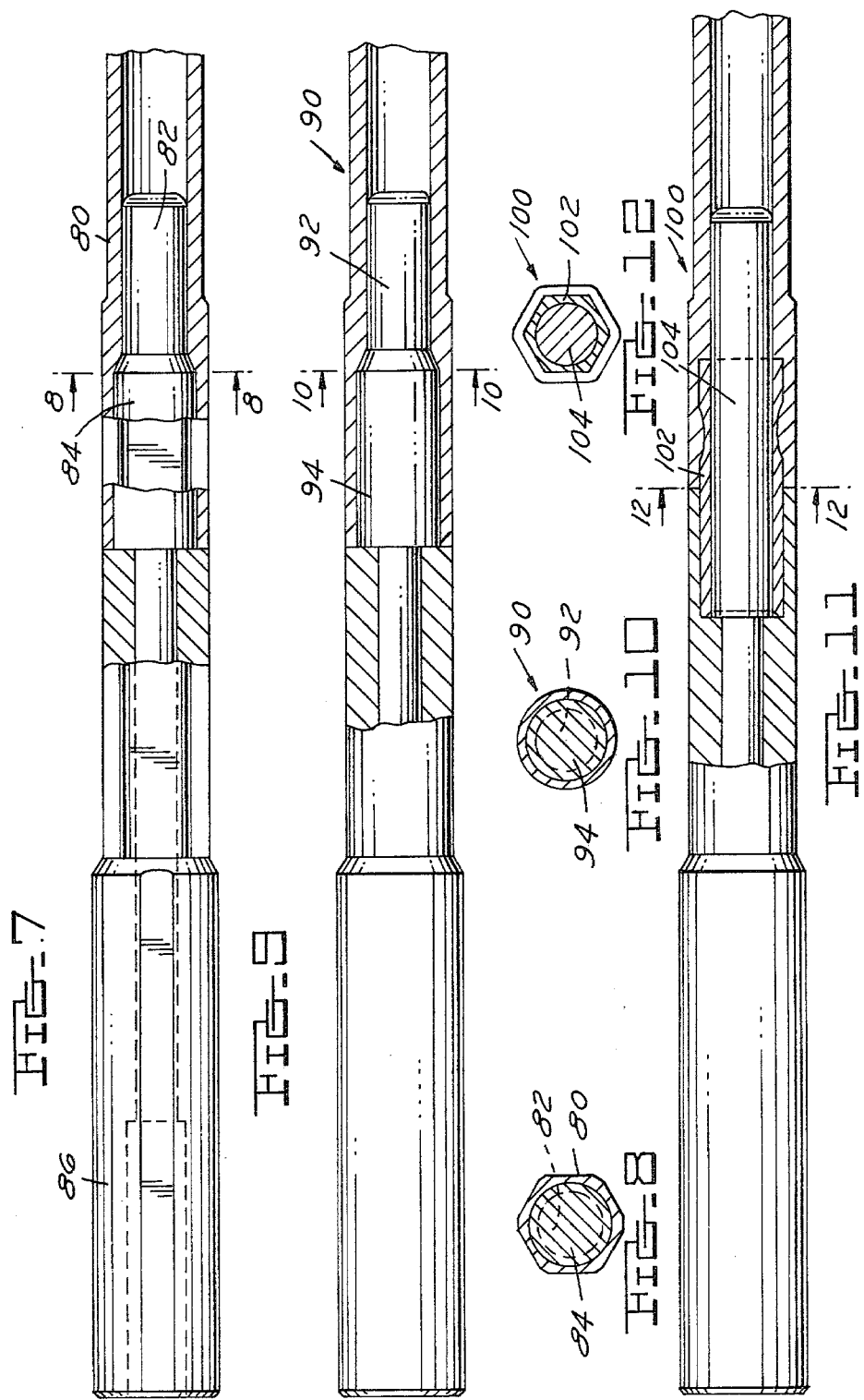

DRILL STEEL AND METHOD OF FABRICATION

FIELD OF INVENTION

Mining and rock and roof drilling in which a rotating power chuck drives a drill bit through hollow shafts called drill steels, these shafts being the starter tubes, the extension tubes used to telescopically engage drilling chucks, and power chucks. Coolant under pressure or air under suction is utilized in the hollow steels to flush away or carry away the drilling dust and fines.

BACKGROUND OF THE INVENTION

"Drill steels" is the term applied to hollow tubes which are used to transmit rotating power from a power source to a drill bit. The steels telescope together to provide a drill train as long as desired for a particular application. The telescopic connection is usually achieved by an ensmalled portion or male end at one end of a steel which fits into a recess at the other end of a corresponding drill steel. The so-called male end or insertion end has been applied to the drill steel by placing and joining an insert part way into the drill steel tube. The insert is joined to the exterior of the drill steel by plug welds 180° apart made in holes or slots premachined in the drill steel. Thus, a portion is extending from the tube and insertable into an adjoining tube.

The present invention contemplates a drill steel which is formed in a two-step process which eliminates the need for any welding and insures a tighter connection for the male end. In addition, the elimination of welds avoids the creation of as-cast and heat-affected zones in the microstructure of the weldments, and also reduces the possibilities for detrimental residual stresses and notchtype defects often associated with weldments.

The improved method of joint assembly not only eliminates the welds, but it provides a stronger joint with true, concentric alignment of the insert in the drill steel and thus improving the straightness of the entire drill assembly. The cost of manufacturing is reduced by the time-saving two-step process.

The preferred method for fabrication of the joint assembly of this invention is by hot upset forging, although other methods such as open or closed die forging and back extrusion might be utilized.

Objects and advantages will be apparent in the following description and claims in which the invention is described in detail to enable a person skilled in the art to practice it, all in connection with the best mode presently contemplated for the invention.

BRIEF DESCRIPTION OF THE DRAWINGS

DRAWINGS accompany the disclosure, and the various views thereof may be briefly described as:

FIG. 1, an illustration of the first step in the process.

FIG. 2, a view of the first punch penetration into the drill steel.

FIG. 3, a view of the male insert which is introduced into the drill steel.

FIG. 4, an end view of the insert.

FIG. 5, a view of the second punch and insert after ramming into the prepared drill steel.

FIG. 6, a sectional view on line 6—6 of FIG. 5.

FIG. 7, a view of the first punch operation in a hexagonal steel.

FIG. 8, a sectional view on line 8—8 of FIG. 7.

FIG. 9, a first punch operation.

FIG. 10, a sectional view on line 10—10 of FIG. 9.

FIG. 11, a view of a second punch operation in a hexagonal steel.

FIG. 12, a sectional view on line 12—12 of FIG. 11.

WITH REFERENCE TO THE DRAWINGS, the present invention involves a two-step process in the formation of a telescoping drill steel. It also involves the use of two parts.

The first part is a drill steel in the form of a medium carbon alloy steel tube which has not had its final heat treatment and which may have a square, round, or hexagonal cross-section. The steel may have a uniform cross-section and vary in length as required. The second part is an insert of much shorter length than the steel and which has an outer dimension preferably slightly smaller than the inner dimensions of the subsequently enlarged end 42 of the drill steel. As shown in the drawings, the cross-sectional shape of the insert is preferably of the same general shape as the inner surface of the enlarged end 42 of the drill steel.

As viewed in FIG. 1, one end of a drill steel 20 of square cross-section is shown. A first punch 30 has a square pilot end 32 and an enlarged square portion 34 with a stem 36 received in a punch driver 40. With respect to the process, the pilot end 32 is shown entering the drill steel 20 in FIG. 1. In FIG. 2, the punch has been driven home so that the portion 34 has enlarged the end 42 of the drill steel.

FIG. 3 shows the male insert 50 as a tube with straight walls and a square cross-section as shown in the end view of FIG. 4. Near the left end of the insert 50, but spaced from the end, the corners have been recessed to provide elongate recesses 52. This insert again is preferably made of a medium carbon alloy steel which has not had its final heat treatment.

The second punch of the fabrication is shown in FIG. 5. It consists of a pilot section 54 which carries the insert 50 dimensioned the same as or within a few thousandths of the enlarged portion 34 of the first punch. Behind the pilot section 54 is a retaining stem 56 suitably anchored in a punch driver 60. The working end 62 of the punch driver 60 has an annular recess 64 around the proximal end of the pilot section 54 which is shaped and dimensioned to receive one end of the insert 50 which seats against a shoulder 66.

Thus, in the second fabrication step, the insert 50 is loaded on to the second punch, the pilot section 54 fitting the inside of the insert and the recess 64 receiving the insert 50.

The punch 54, thus loaded with the insert 50, is driven with a quick sharp blow into the enlarged end 42 of the steel 20. In this operation, the pilot 54 maintains and smooths the inner diameter of the steel. The end 70 of the punch driver 60 strikes the end 72 of the steel. This drives the metal of the steel back and around the insert 50 so that the walls 42 of the steel are forced into the recesses 52 and also tightly around the outer walls of the insert 50. This is an upset process of a hot drill steel around a cold insert, and may change the overall length of the drill steel ¼ to ⅜ of an inch.

The punch 54 is then withdrawn from the steel, leaving the exposed end of the insert 50 as a male insert to telescope into a female recess in the other end of a similar steel. The parts are then given a final heat treatment and the steel is ready for use. The projection end of the male insert will telescope into the end of an adjacent steel and permit the lengthening of the driving chain of drill steels.

In FIG. 6, the section shows the assembled parts with the strike-in portions seated in the recesses 52.

In FIGS. 7 to 12, additional embodiments are illustrated. FIGS. 7 and 8 show a hexagonal steel with a round punch 82-84 on a driver 86.

FIGS. 9 and 12 show a round steel 90 with a punch 92-94.

FIGS. 11 and 12 illustrate a hexagonal steel 100 with a hexagonal insert 102 on a driver punch 104. Other combinations within the purview of the invention may be made. For example, any convenient polygonal cross-section may be used or a modified out-of-round cross-section may be used.

The basic reason for utilizing the first punch to open up the receiving end of the drill steel is to have a completed bit driving line with an open central passage for coolant fluid. In some cases, water is forced up the interior passage formed by the telescoped tools to cool the drilling bit and wash the cuttings down the outside of the driving line. In other cases, subambient pressure is applied to the central passage and cuttings are brought down through the passage. In either case, and more particularly, in the latter case, an unrestricted central passage through the telescoped steels is desirable. By enlarging the receiving end 42 (FIG. 2), the insert 50 (FIG. 5) can have an inner diameter substantially equal to the interior diameter of the drill steels.

We claim:

1. A drill steel for use in a tandem string of telescopically joined drill steels for rock and roof drilling which comprises:
    (a) a tubular drill steel having a straight internal passage of a first predetermined cross-sectional dimension,
    (b) an enlarged end formed on said drill steel having a straight cylindrical recess with a second internal cross-sectional dimension larger than said first cross-sectional dimension and coextensive from its free end with said enlarged end and terminating in a common plane with the end of said passage of a first predetermined cross-sectional dimension, and with said plane being normal to said recess and intermediate said enlarged end,
    (c) a male insert of straight cylindrical shape having one end projecting into said cylindrical recess of said enlarged end of said drill steel and formed with an internal cross-sectional dimension substantially equal to and continuous with said first cross-sectional dimension and an external cross-sectional dimension equal to and interfitted with the said second internal cross-sectional dimension of said enlarged end of said drill steel, the other end of said cylindrical insert projecting from said enlarged end of said drill steel, said enlarged end forming a stop shoulder intermediate said insert to locate an adjacent telescoped drill steel, and
    (d) means on said interfitting surfaces of said drill steel and said insert mechanically interlocking said drill steel and said insert.

2. A method of fabricating a drill steel for use in a tandem string of telescoped drill steels for work and roof drilling which comprises:
    (a) selecting a tubular drill steel, and introducing into the end of said drill steel a first punch to enlarge the diameter of one end of said drill steel to receive a male insert having an internal diameter approximating the internal diameter of said drill steel,
    (b) selecting a male insert with a first portion to be projected into said drill steel and with a second portion to extend outwardly of the drill steel concentric with the drill steel,
    (c) installing said male insert on a punch having a forward pilot portion with a distal end to be received in said drill steel and an annular recess concentric with a proximal portion of said pilot portion to receive said second portion of said male insert,
    (d) driving said punch into said drill steel to insert said first portion of said male insert into said drill steel,
    (e) striking the end of said drill steel to close the metal of said drill steel tightly around the first portion of said male insert, and
    (f) withdrawing the punch to leave the male insert in the drill steel.

3. A method of fabricating a drill steel for use in a tandem string of telescoped drill steels for rock and roof drilling which comprises:
    (a) selecting a tubular drill steel,
    (b) introducing into the end of said drill steel a first punch to enlarge the diameter of one end of said drill steel to form a straight cylindrical recess to receive one end of a male insert having an external diameter to permit it to be received into said enlarged diameter and an internal diameter approximating the internal diameter of the original drill steel,
    (c) selecting a male insert in the form of a straight cylinder with a first portion to be received in said enlarged portion of said drill steel and a second portion to extend outwardly of the drill steel concentric with the drill steel,
    (d) installing said cylindrical male insert on a second punch having a pilot portion interfitting the internal diameter of said insert and projecting beyond said insert and having a rearward portion at the proximal end of said pilot portion dimensioned to receive said second portion of said male insert,
    (e) moving said second punch initially into said enlarged drill steel to advance said male insert into said enlarged diameter, said pilot portion serving to center said insert and second punch and maintain the internal dimension of the insert,
    (f) advancing said second punch to cause said rearward portion to impact the enlarged end of said drill steel to close the metal of said drill steel tightly around the first portion of said male insert, and
    (g) withdrawing the punch to leave the male insert in the drill steel.

4. A method as defined in claim 3 in which said first punch has a pilot portion to enter the internal passage of the drill steel to maintain its dimension while a larger following portion of said first punch is enlarging the end of said drill steel by projection into said drill steel.

5. A drill steel for use in a tandem string of telescopically joined drill steels for rock and roof drilling which is formed as a product of the method of claim 3.

* * * * *

UNITED STATES PATENT AND TRADEMARK OFFICE
CERTIFICATE OF CORRECTION

PATENT NO. : 4,299,510

DATED : November 10, 1981

INVENTOR(S) : Kenneth C. Emmerich and Donald K. Chrise

It is certified that error appears in the above-identified patent and that said Letters Patent are hereby corrected as shown below:

Col. 3, Line 48, change "continuous" should be -- contiguous --.

Signed and Sealed this

Ninth Day of February 1982

[SEAL]

Attest:

Attesting Officer

GERALD J. MOSSINGHOFF

Commissioner of Patents and Trademarks